United States Patent
Alexander

(10) Patent No.: US 8,000,725 B2
(45) Date of Patent: Aug. 16, 2011

(54) METHOD AND APPARATUS FOR TRANSPARENT INVOCATION AND TRANSPORT OF ENCRYPTED POSITION LOCATION DATA

(75) Inventor: Roger K. Alexander, Rockville, MD (US)

(73) Assignee: Andrew, LLC, Hickory, NC (US)

( * ) Notice: Subject to any disclaimer, the term of this patent is extended or adjusted under 35 U.S.C. 154(b) by 607 days.

(21) Appl. No.: 11/694,352

(22) Filed: Mar. 30, 2007

(65) Prior Publication Data

US 2008/0242374 A1 Oct. 2, 2008

(51) Int. Cl.
*H04W 24/00* (2009.01)
(52) U.S. Cl. .............. 455/456.3; 455/414.2; 455/411; 455/456.1
(58) Field of Classification Search .............. 455/404.2, 455/410, 414.2, 438, 440, 457, 456.1–456.3, 455/404.1, 414.1; 340/988–996; 342/450–465; 726/1–36; 380/270
See application file for complete search history.

(56) References Cited

U.S. PATENT DOCUMENTS

| | | | |
|---|---|---|---|
| 6,671,377 B1* | 12/2003 | Havinis et al. | 380/258 |
| 2002/0004399 A1* | 1/2002 | McDonnell et al. | 455/456 |
| 2003/0074553 A1 | 4/2003 | Arkko et al. | |
| 2003/0166398 A1 | 9/2003 | Netanel et al. | |
| 2004/0203900 A1* | 10/2004 | Cedervall et al. | 455/456.1 |
| 2004/0266453 A1 | 12/2004 | Maanoja et al. | |
| 2005/0043038 A1 | 2/2005 | Maanoja et al. | |
| 2005/0043041 A1 | 2/2005 | Ignatius et al. | |
| 2005/0114694 A1* | 5/2005 | Wager et al. | 713/200 |
| 2006/0099970 A1 | 5/2006 | Morgan et al. | |
| 2007/0082645 A1* | 4/2007 | Malomsoky et al. | 455/338 |

* cited by examiner

*Primary Examiner* — Kent Chang
*Assistant Examiner* — San Htun
(74) *Attorney, Agent, or Firm* — Duane Morris, LLP

(57) ABSTRACT

In one embodiment, the disclosure relates to a method for locating a mobile terminal in a communication network. The method includes: receiving a request data frame for locating the mobile terminal; uniquely encoding at least a portion of the request data frame (at an LCS client); determining the location of the mobile terminal (by a PDE); communicating the location information of the mobile terminal in a response data frame having an encrypted portion; and decrypting the location information of the mobile terminal (at the LCS client).

39 Claims, 5 Drawing Sheets

METHOD AND APPARATUS FOR TRANSPARENT INVOCATION AND TRANSPORT OF ENCRYPTED POSITION LOCATION DATA

BACKGROUND

Advanced telecommunication systems provide geolocation services in addition to the traditional telephony services. Geolocation equipment determines the geographical location of the mobile terminal and provides services such as providing directions or directing the mobile terminal to nearby points of interest. Geolocation equipment may provide other services including the Emergency 911 (E911) service, PLMN operator services, and Lawful Intercept services in which user location may be needed.

Conventional communication systems carry voice, data and multimedia communication on the user plane while conducting signaling which supports the actual communication on the control plane. Control plane-based position location relies ultimately on the exchange of signaling messages between an external location services client (LCS) and the internal network position determination entity (PDE) that is responsible for the actual location calculation. Locating a mobile terminal can be done on the control plane or the use plane. The third Generation Partnership Project (3GPP) provides technical specification and functional description of the provision for location information.

For control plane, as opposed to user plane positioning, signaling messages must be sent across different interfaces and between the many network elements involved in the transaction. In the case of the uplink time-difference of arrival (U-TDOA) positioning, the originating LCS client sends a position location message in the form of a request data frame to a gateway mobile location center (GMLC). The GMLC processes this message, performs the necessary inquiry of the network to determine the current visited Mobile Switching Center (MSC) for the mobile terminal and then directs the position request to the MSC.

The visited MSC in turn processes the request and based on the available information establishes a dedicated connection to the mobile to send a position location request message to the Base Station Controller (BSC). The BSC submits the request to a connected Serving Mobile Location Center (SMLC) which makes a determination on the type of positioning method to be applied and, in the case of U-TDOA selection, sends a perform location request to the Position Determining Entity (PDE)/(GCS) along with the associated radio information needed to locate the mobile.

Once the mobile terminal's location has been calculated, a response message is sent from the PDE to the SMLC. The SMLC will in turn produce a location response for the BSC which includes the mobile terminal's location. The BSC sends a response to the MSC and the MSC will generate a response message for the GMLC. The GMLC then responds to the location information to the originating LCS client. A different protocol exists on each interface of the position location path, including MLP, MAP-G, BSSMAP, BSSMAP-LE and RPP, respectively (protocols familiar to those skilled in art of mobile and location technologies).

Similarly, the position location response messages are interpreted by each of the intervening elements along the return path. Based on the success, failure, radio changes or other mobile status identified in the returned messages, the position location network elements may take appropriate action. The GMLC is responsible for sending the final location information to the requesting LCS client for delivery to originating location service user (location requester).

While GSM and UMTS provide system security and signaling confidentiality for over-the-air communications, no security is provided for communications between network elements. For content and service providers, end-to-end security must be independently supported. In the case of control plane-based location, this security must be implemented recognizing various network elements and potential signaling interface manipulations that occur along the location infrastructure path.

There are a number of limitations in the conventional control plane-based mobile system signaling processes that pose challenges when security applications need to be supported within an existing network infrastructure. A first challenge is the need for confidentiality to prevent requested position location information from being accessible to external entities including various network elements that must communicate by generating and transferring the mobile terminal's location. While this can be achieved by encrypting the information that is exchanged between the LCS client and the PDE, it is made difficult by the different intervening elements and the various signaling protocol interfaces along the communications paths. Another problem is the need to be selective in the security that is applied by the position determination entity when the LCS infrastructure supports multiple services. In particular, where the same PDE supports emergency (and other value added or operator location services) as well as security services, it is important that only responses to the security client be encrypted. Conventional systems do not provide this feature. Finally, there is a need for a security application to be able to dynamically change the applied encryption parameters during the on-going service as a means of providing enhanced forward security.

It is desirable to meet these objectives without the knowledge or impact on intervening network elements or on the standard network signaling protocols. There are no mechanisms in the standard signaling exchange that allows an LCS client to initiate or selectively change the security parameters needed for encryption on a request-by-request basis.

SUMMARY

The exemplary embodiments disclosed herein overcoming the challenges associated with implementing position location confidentiality within the network. In one embodiment, the disclosure provides a transparent method that overcomes the deficiencies of the conventional networks without the need for external signaling or communication mechanisms between the LCS client and PDE.

In one embodiment, the disclosure relates to a method for locating a mobile terminal in a communication network, the method comprising: receiving a request data frame from a service user to locate the mobile terminal; encrypting at least a portion of the request data frame by an LCS client; determining a location information for the mobile terminal; forming a response data frame with the location information encrypted; decrypting the response data frame and reporting the decrypted location information to the requesting service user. The response data frame can be encrypted using an encryption algorithm that, in one embodiment, can be specified and changed over time through a network management system. Further, the request data frame further can comprises a message link field value with an encrypted position location information and an encrypted security signaling control information for allowing only the receiving LCS client to decrypt the location information.

In another embodiment, the disclosure relates to a network for locating a mobile terminal within a service area, the network comprising: a Network Management System (NMS) in communication with a Location Service (LCS) client, the NMS receiving a request data frame for locating the mobile terminal and at least one of encrypting a portion of the request data frame or changing the encryption algorithm of the request data frame; a switching subsystem for identifying information related to mobile terminal's location; and a position determination entity (PDE) for receiving the mobile terminal location information and calculating the location of the mobile terminal within the network service area. The NMS can communicate with the LCS client and a PDE. In one embodiment, the NMS supports the setup and configuration of the ciphering suite that may be invoked between the LCS client and the PDE. The NMS can, for example, allow the baseline ciphering algorithms used by the PDE and LCS client to be changed over time. In one embodiment, the PDE can be invoked by the LCS client to encrypt the position information associated with a particular location request.

In still another embodiment, the disclosure relates to a controller for locating a mobile terminal within a communication network, comprising: a circuitry having at least one microprocessor, and a memory in communication with the microprocessor, the memory is programmed with instructions to: receive a request data frame from a client to locate the mobile terminal; encrypt at least a portion of the request data frame; determine location information for the mobile terminal; form a response data frame having encrypted location information; decrypt the location information and communicate the decrypted location information to the client.

In still another embodiment, the disclosure relates to an LCS client for requesting the location of a mobile terminal within a communication network, comprising: a circuitry having at least one microprocessor, and a memory in communication with the microprocessor, the memory is programmed with instructions to: uniquely encode a request data frame sent to a PDE locate the mobile terminal where the unique encoding allows the PDE to determine that the particular location response must be encrypted; decrypt the location information and communicate the decrypted location information to the client.

BRIEF DESCRIPTION OF THE DRAWINGS

These and other exemplary embodiments of the disclosure will be discussed with simultaneous reference to the following exemplary drawings in which.

DETAILED DESCRIPTION

Figure 1:
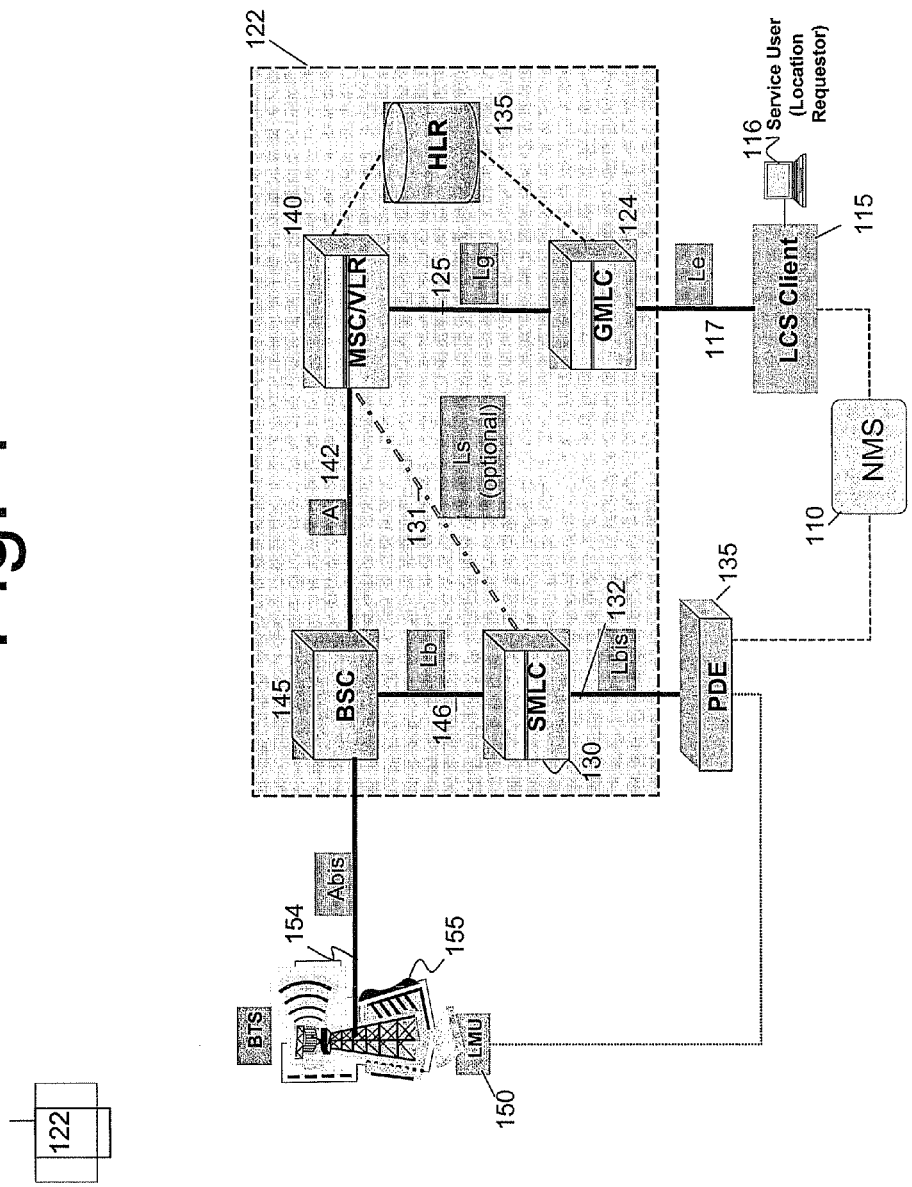
FIG. 1 is a communication network architecture according to an embodiment of the disclosure.

FIG. 1 is a communication network architecture according to an embodiment of the disclosure. FIG. 1 provides an overview of the relevant location services network infrastructure, including a PDE element for a GSM network-based position location. While the disclosure is discussed in relation with a GSM or an UMTS network, the inventive concepts disclosed herein are not limited thereto and can be implemented with any communication system.

In FIG. 1, network 100 includes Network Management System (NMS) 110 which configures the ciphering suites (algorithms, keys, etc.) that will be used when encryption is invoked between the LCS client and PDE. External LCS client 115 can receive a request from Service User Requester 116 and submit a mobile terminated (MT-LR) location request for a targeted mobile terminal 120 and receive position location responses through the Le interface 117 to GMLC 124. In a case of a U-TDOA positioning, LCS client 115 sends position location message in the form of a request data frame to GMLC 124.

The Serving Mobile Location Center (SMLC) 130 can be a location entity within switching subsystem 122 to which the location request is ultimately forwarded. SMLC 130 interfaces with PDE 135 across the Lbis interface 132. The Home Location Register (HLR) 135 provides GMLC 124 with the identity of the Mobile Switching Center/Visitor Location Center (MSC/VLR) 140 at which mobile 120 is currently registered to facilitate the MT-LR request. GMLC 124 signals MSC 140 through Lg interface 125 which in turn will process the information request and send a position location request message to BSC 145 over link 142. BSC 142 can also communicated with BTS 155 over Abis interface 154. BSC 142 can then submit the location request to SMLC 130 through interface Lb 146. SMLC 130 can decide the type of positioning method to be used. SMLC 130 can optionally communicate directly with MSC/VLR 140 across interface Ls 131. Typical positioning methods may include angle of arrival (AOA), time-difference of arrival (TDOA) or global positioning system (GPS).

Once the positioning method is selected, a request for locating mobile terminal 120 can be sent to PDE 135 across interface Lbis 132 with any additional information needed to locate mobile terminal 120. In one embodiment, the request can be directed to a Location Measurement Unit (LMU) 150. A conventional LMU 150 may contain sensitive radio receivers for detecting even weak signals and determining the location of mobile terminal 120. LMU 150 can be co-located with base station 155. LMU's location measurement data can be communicated directly to PDE 135 for calculating the position location for mobile terminal 120. The derived position location can be returned to the MSC 140 from the SMLC 130 via BSC 145 or via optional Ls interface 131. The MSC can in turn direct a response message to GMLC 124. GMLC 124 can then respond to the originating LCS client 115 with a response data frame containing the location information.

The elements of switching subsystem 122 use different interfaces to communicate with each other. These interfaces include, for example, MLP, MAP-G, BSSMAP, BSSMAP-LE and RPP. To improve security without interrupting the various interfaces, a portion of the location request data frame containing location information can be encrypted such that the remainder of the data frame can travel through switching subsystem 122 without interfering with the network performance. In one embodiment of the disclosure, NMS 110 can enable security mechanisms (private/public keys, certificates algorithms, etc.) to be configured at PDE 135 and LCS client 115 according with the desired security level.

Figure 2:
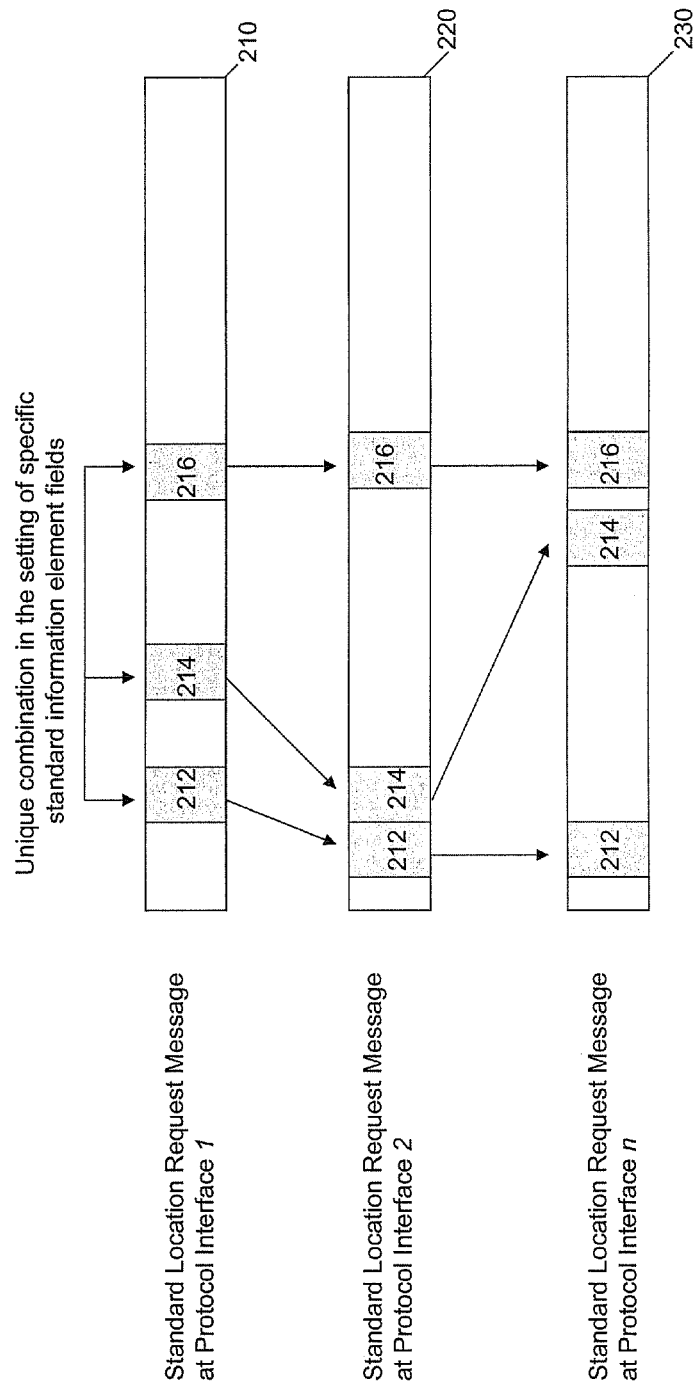
FIG. 2 is a conceptual illustration of an exemplary location request data frame as it traverses the control plane path across multiple equipment interface from the originating LCS client to the PDE.

FIG. 2 is a schematic illustration of an exemplary data frames. Data frames 210, 220 and 230 can define a location request data frame or a location response data frame. Each exemplary data frame can include position location information 212, 214 and 216 as well as security signaling control information (not shown). The position location information and the security signaling control information can be encrypted.

The location request message can exist at different positions of the data packet based on the protocol interface. Data frames 210, 220 and 230 show unique combinations in the placement of specific standard information element fields. For example, data frame 210 shows the location request message information element fields 212, 214 and 216 at a particular position compatible with protocol interface 1. Data frame 220 schematically illustrates standard location request message at a second protocol interface having information element fields 212, 214 and 216 at different positions. Finally, data frame 230 schematically illustrates a standard location request message at protocol interface n having standard information element fields 212, 214 and 216 at yet a different position. In one embodiment of the disclosure, the step of encrypting at least a portion of the request data frame further comprises a unique encoding of the standard information elements of the location request. The encoding can be done by the LCS client.

According to an embodiment of the disclosure a secure exchange of user position location between an external LCS client and the network PDE that calculates the user position can be implemented by encrypting the data signals (i.e., data packets) at the NMS. The devised signaling mechanism can use components that are uniformly translated or transferred across the various signaling protocol interfaces. The control and routing of ciphered position location information can be achieved without the knowledge of, or impact on, any other of the position location or network elements within the standard mobile communications network. The disclosed method and mechanism can also allow the different LCS clients of the same category type (emergency, value added, operator, etc.) and even the same LCS client to concurrently request encrypted or unencrypted position locations from a single PDE across the same mobile network infrastructure.

As stated, a standard mobile network typically supports location services associated with emergency calls (such as E911), lawful intercept, and value added services which do not require the ciphering of the derived user position location. These services and the associated LCS client types must be capable of operating concurrently in the same network and across the same infrastructure used for security applications in which a particular LCS client requires the ciphering of user locations. While LCS client type information is typically conveyed through the system and received by the PDE, LCS client ID information is not.

Thus, according to one embodiment of the disclosure a unique differentiator can be provided allowing the PDE to recognize the need for location encryption even when the request originates from a client (for example, particular emergency or lawful intercept LCS client) who may not require encryption of the position information. A combination identifier can also be used to support the binary indication of when encryption must be applied on a request-by-request basis. The information elements from which the LCS client-to-PDE encryption indicator is drawn can include: (1) LCS Client Type, (2) LCS Priority, and (3) LCS Quality of Service (QOS).

An LCS client can be identified by a LCS Client ID in an originating location request and the ID can be mapped to an LCS Client type at the GMLC 124 (FIG. 1) according to the client's service configuration.

LCS Priority may include: Normal or High. The LCS priority requested by the LCS client 115 (FIG. 1) flows through to the PDE across the Lbis interface 132 (FIG. 1) and can be available for interpretation as part of a encryption-required indicator. In one embodiment, LCS client 115 can have the flexibility to support both encrypted and unencrypted user location. In another embodiment, the LCS priority can be modified at the GMLC in accordance with the subscription configuration of the LCS client 115.

At LCS client 115 (FIG. 1), QoS (or Quality of Position, QoP) may include a combination of horizontal accuracy (in distance radius), vertical accuracy (in height) and response time (no delay, low delay, or delay tolerant). The response time can be converted to an actual time value (e.g., in 500 ms increments) by SMLC 130 and sent to the PDE 135 in addition to the original QoS. Thus, the options available to the LCS client to provide an encryption indicator to the PDE using the LCS QoS field can be governed by the response time, horizontal accuracy and vertical accuracy.

The decision as to the positioning method to be applied for a given location request can be made at the SMLC and influenced directly by the QoS objectives, in terms of horizontal (and vertical) accuracy required, as well as by network and mobile terminal capabilities. To ensure that the appropriate PDE (for example in the case of U-TDOA) is tasked for a given request, the position accuracy requirements can be sufficiently stringent to invoke the appropriate method while reduced enough to avoid using other methods with more accurate determination capability (such as GPS, for example).

To ensure that a unique identifier can be applied without overlapping with existing client services, a so-called contrarian parameter combination can be used. This can take the form of, for example, emergency service, with low priority and delay tolerant quality of service (QoS) specification—a combination that will typically not be applied by any normal LCS client. To further increase the robustness of the encryption indicator a unique horizontal accuracy value, such as 88 m for example, may also be designated. The unique horizontal accuracy can be set by the LCS client in conjunction with the defined LCS client type, priority and other QoS element specification.

The actual security methods and algorithms between the LC client and PDE for the encryption and decryption of the location information can be configured using NMS 110 (FIG. 1) or other external means. This enables full flexibility in the specification of security schemes, including selection of algorithms, encryption block lengths, key lengths, etc. in accordance with the level of encryption security desired for the system.

The coding of the encrypted user location information can be supported in the standard location signaling messages from PDE 135 (FIG. 1) by ensuring that standard message header information elements and formats are preserved. Thus, according to an embodiment of the disclosure, only the user location data will be transported in encrypted form. The embodiment may also include a method for return signaling from PDE 135 to LCS client 115 to support more sophisticated encryption mechanisms. For example, PDE 135 can appropriately increase the message length field value of standard location response messages to include the encrypted position location information as well as a defined security signaling control information element.

In an exemplary GSM implementation, the derived position location can be sent from the PDE in the form a Location Estimate (Geographic Location) information element (IE) parameter with a maximum length of 22 bytes (including IE type and length fields). The position location can be coded as "Type of Shape" and "Shape Description." The coding of an Ellipsoid point requires 9 bytes (including IE type and length fields), an Ellipsoid point with uncertainty circle may require 10 bytes, and an Ellipsoid Point with uncertainty Ellipse may require 13 bytes.

Thus, by increasing the indicated message length (within the permitted limits of the standards specification), PDE 135 can include information such as per request nonce values, random numbers, or key sequence numbers from which LCS client 115 can derive the decryption keys for a particular user position location. The security signaling information elements can be appended entirely within the standard position location result field. This will ensure that intervening network elements (i.e., components of switching subsystem 122) that do not need to process the actual position location value can continue to apply standard message processing without interruption.

Figure 3:
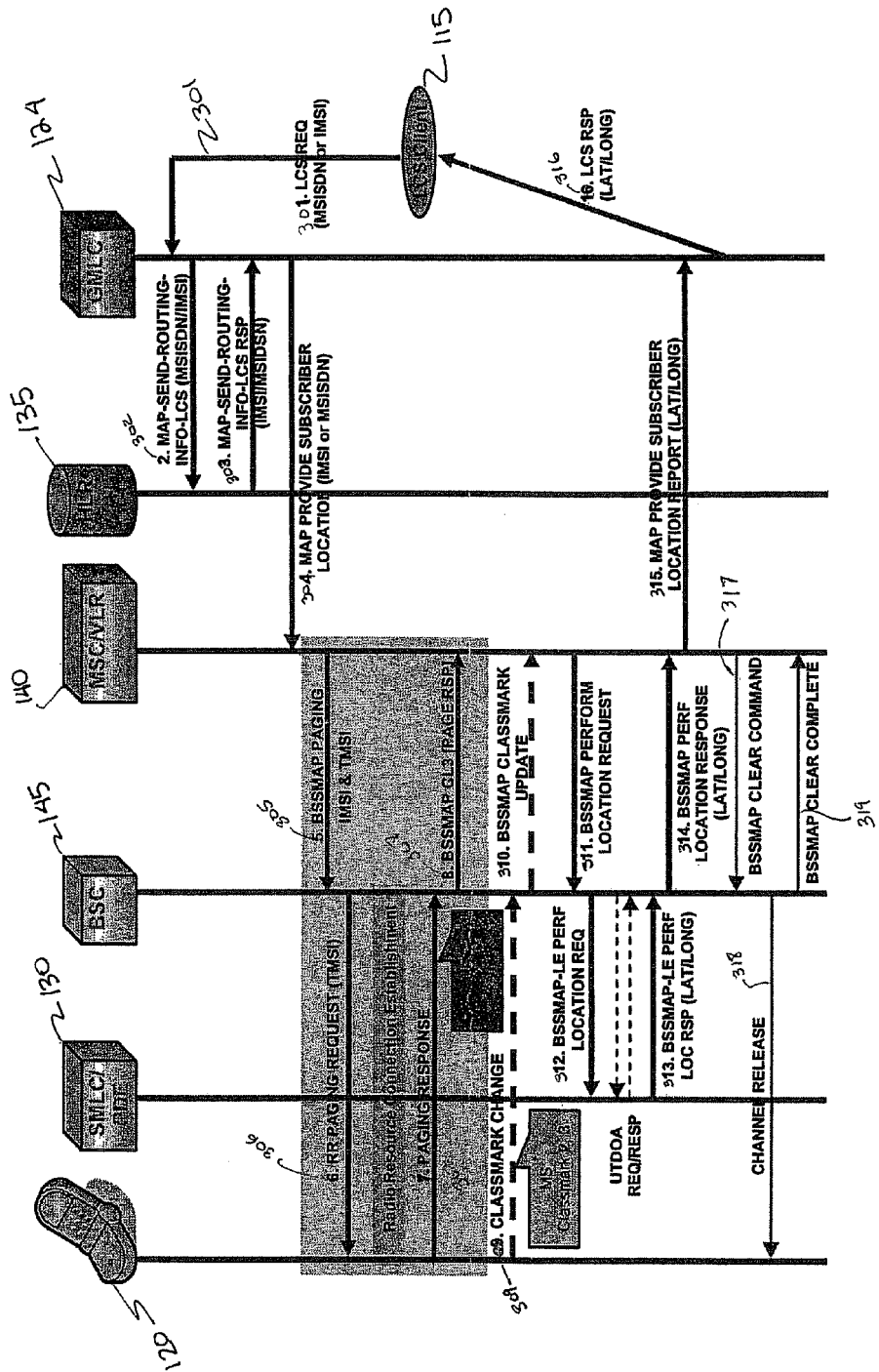
FIG. 3 illustrates a location request signaling exchange according to one embodiment of the disclosure.

FIG. 3 illustrates a location request signaling exchange according to one embodiment of the disclosure. More specifically, FIG. 3 illustrates the signaling exchanges that occur when a request for a mobile's location is initiated by LCS client 115 where the targeted mobile terminal 120 is initially in Idle mode. As shown in FIG. 3, any information exchanged between LCS 115 client and the PDE must be signaled through GMLC 124, HLR 135, MSC/VLR 140, BSC 145 and SMLC/PDE 130 switching subsystem elements. In step 301, LCS client 115 issues a request data frame for locating mobile terminal 120 to GMLC 124. While not shown in FIG. 3, a network management system (NMS 110, FIG. 1) can communicate with LCS client 115 to configure the algorithms for encryption that may be applied for the location request signal according to the embodiments disclosed herein. The request may include Mobile Station Integrated Services Digital Network (MSISDN) or International Mobile Subscriber Identifier (IMSI) for mobile terminal 120.

In step 302 GMLC 124 looks up HLR database 135 to determine the last visited MSC 140 of mobile terminal 120. In step 303, HLR 135 maps the mobile terminal's routing and responds to GMLC 124. In step 304, GMLC 124 sends position request to the identified MSC/VLR 140. Again, the request can be in the form of MSISDN or IMSI. In step 305, MSC/HLR 140 signals BSC 145 to establish a dedicated connection to mobile terminal 120. In step 306, BSC 145 pages mobile terminal 120. In step 307, mobile terminal 120 responds to the page and establishes a radio connection with BSC 145. This communication can include the mobile terminal's classmark indication. In step 308, BSC 145 responds to MSC 140 page which was received in step 305. In steps 309, mobile terminal 120 reports a classmark change to BSC 145. In step 310, BSC 145 reports the mobile terminals' classmark change to MSC 140.

In step 311, MSC 140 requests location determination for mobile terminal 120 from BSC 145. In step 312, BSC 145 submits a request to SMLC/PDE 130 to determine a suitable type of positioning method and locate mobile terminal 120. In step 313, SMLC/PDE 130 reports latitude and longitude information of mobile terminal 120 to BSC 145. In step 314, BSC 145 relays the latitude and longitude information to MSC 140. In step 315, MSC/VLR 140 provides the location report to GMLC 124 and in step 316, GMLC 124 relays the location information to LCS client 115. The additional steps of clearing command, releasing channel and reporting complete clearing are shown as steps 317, 318 and 319. In one embodiment, the location information can be decrypted by SMLC/PDE 130 at step 313 or by another network element prior to its communication to LCS client 115.

Figure 4:
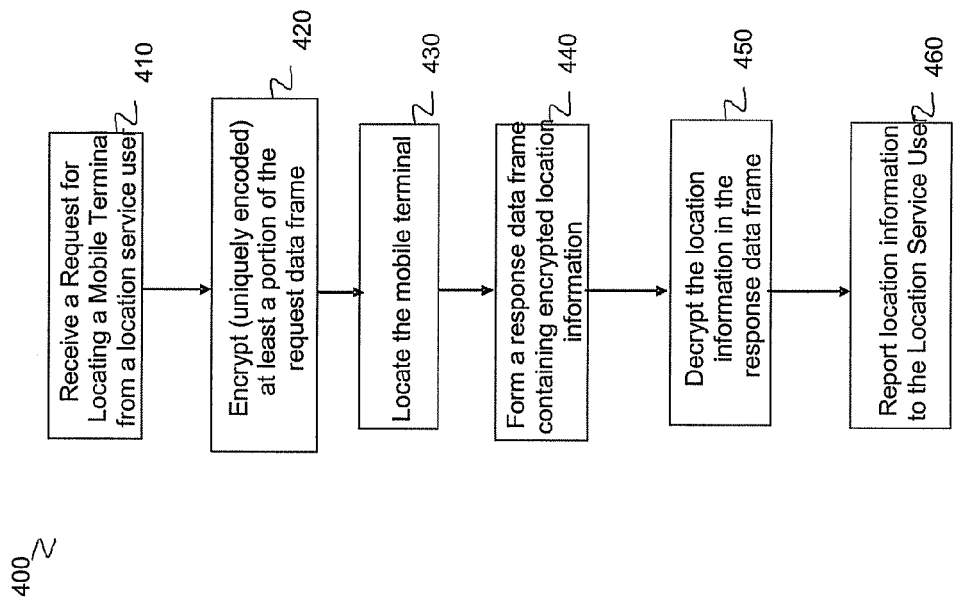
FIG. 4 is an algorithm according to one embodiment of the disclosure.

FIG. 4 is an algorithm according to one embodiment of the disclosure. The network can optionally comprise a GSM or a UMTS network. The particular algorithm 400 of FIG. 4 to be employed can be configured by a controller residing at the NMS (see NMS 110 at FIG. 1). In step 410, a request for locating a mobile terminal is received from a location service user. The request can be issued from an internal or an external service user. The data frame may contain general information required for network communication including information for identifying the mobile terminal and the type or accuracy of the location request. According to an embodiment of the disclosure, in step 420 at least a portion of the request data frame can be encrypted (with the information elements uniquely encoded) by the LCS client in a manner that such encryption does not interfere with the network processing and communication of the request data frame sent through the network to the PDE which determines the mobile terminal's position location. Step 420 can be implemented at the LCS client.

In step 430 the network, and ultimately the PDE, processes the location request to locate the mobile terminal. The processing step may include several sub-steps not shown in FIG. 4. However, an exemplary processing has been disclosed in relation to FIG. 3. Once the mobile is located, the location information (i.e., a response data frame) can be communicated back to the LCS client (step 440). According to one embodiment of the disclosure, the response data frame can have an encrypted portion to protect the location information. In step 450, the response data frame can be decrypted by the LCS client and in step 460, the decrypted location information can be communicated to the originating service user. Thus, in one embodiment, the LCS client handles encryption (uniquely encoding the request such that the PDE recognizes that for a particular request the derived position location must be encrypted) and decryption of the location result which is sent to the authenticated and authorized user.

Figure 5:
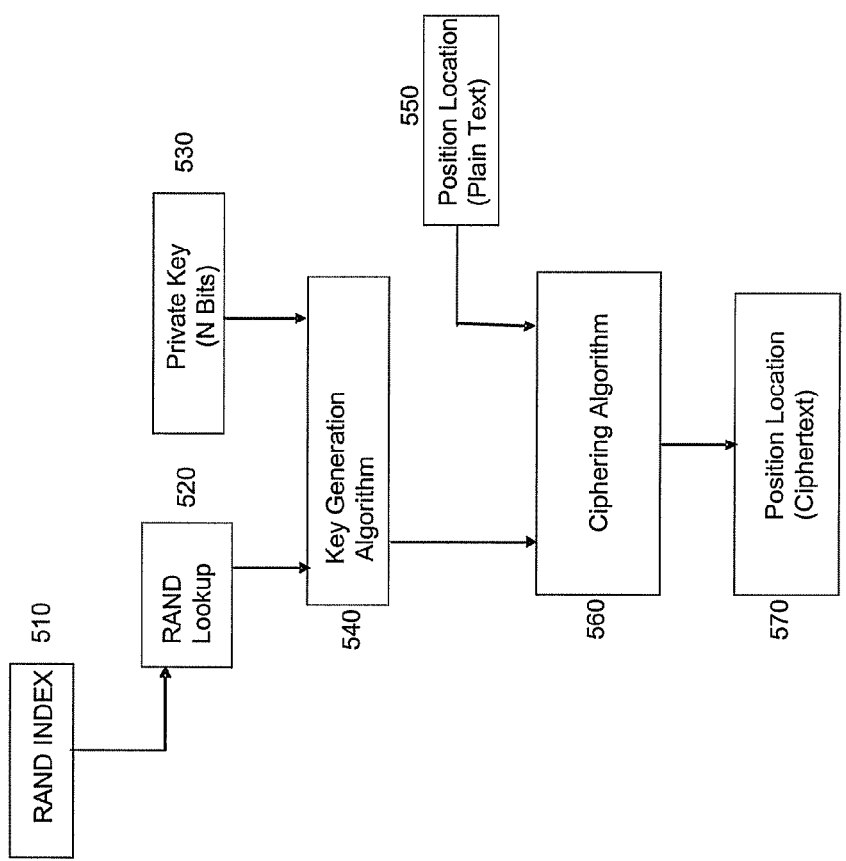
FIG. 5 illustrates an encryption process according to one embodiment of the disclosure.

FIG. 5 provides an example of a generic ciphering process that can be applied in the context of the current disclosure. In the embodiment of FIG. 5, private key encryption 530 (where the PDE and LCS client use a common key for encryption and decryption respectively) is used to encrypt position location information. A short (8-bit, for example) RANDOM number (RAND) index value 510, sent together with the encrypted position location, can be used as a pointer to a set of pre-stored RANDOM numbers. The RAND lookup table 520 can be also used to select the appropriate RAND. The size of the index can determine the number of potential RAND values but it does not limit the length of the RAND that can be employed. The position location message 550 returned from the PDE can provide a pointer to the portion of the data packet containing location information.

The selected RAND 520 together with a pre-specified (by the NMS) key generation algorithm 540 and stored private key 530 (of any desired length) can be used to derive the encryption key 560 for ciphering the PDE-calculated position location. The key generation and ciphering algorithm can be pre-specified at the PDE and LCS client.

The network can be configured so that in transmitting the ciphered position location to the LCS client only the RAND index can be required. In an embodiment, a security header field can also be specified to allow additional security signaling information to be sent from the PDE to LCS client. Thus, for the addition of a minimum overhead to the position location information, a robust transparent security system can be implemented. For example, a private key of desired length (e.g., 56 bits) can be used in ciphering of the position location using the pre-configured algorithm (such as a DES block cipher). In step 570, the location information is encrypted. As discussed in relation to FIG. 1, the network management system or a controller can allow appropriate configuration of the PDE and LCS client to implement the required security standards.

Using the RAND index can provide a measure of forward security by allowing dynamic changes in the encryption key while also avoiding the need to send a full RAND. The ability to maintain a given ciphering key for any defined (configured) period of time will allow the PDE to calculate an encryption key prior to its usage in ciphering a particular mobile position location result. This can improve the efficiency of the overall encryption processing at the PDE and at the LCS client.

Other types of security mechanisms can be specified between the LCS client and the PDE and configured through the NMS without departing from the principles disclosed herein. Security can be further enhanced by the absence of inter-working requirements to publish or disseminate details of the key generation or encryption algorithms that are local to the LCS client and PDE elements. As disclosed, the return PDE-to-LCS client signaling mechanism together with security mechanisms established through configuration of the PDE and LCS client enables a wide range of security methods to be applied in encrypting the position location information for client-indicated location requests.

The above description is not intended and should not be construed to be limited to the examples given but should be granted the full breadth of protection afforded by the appended claims and equivalents thereto. Although the disclosure is described using illustrative embodiments provided herein, it should be understood that the principles of the disclosure are not limited thereto and may include modification thereto and permutations thereof.

What is claimed is:

1. A method for locating a mobile terminal in a communication network, the method comprising:
   receiving a request data frame from a service user to locate the mobile terminal, the request data frame having one or more information element fields with location information or security signaling control information;
   providing an encryption identifier to recognize the need for encryption, the identifier including type, priority and quality of service portions;
   encrypting at least one of the information element fields of the request data frame by a Location Service (LCS) client using the encryption identifier;
   determining latitude and longitude location information for the mobile terminal;
   forming a response data frame with the latitude and longitude location information encrypted;
   decrypting the response data frame and reporting the decrypted location information to the requesting service user.

2. The method of claim 1, wherein the communication network is a Global System for Mobile Communication (GSM) network.

3. The method of claim 1, wherein the communication network is a Universal Mobile Telecommunication System (UMTS) network.

4. The method of claim 1, wherein the client and service user are external to the communication network.

5. The method of claim 1, wherein the step of encrypting at least a portion of the request data frame further comprises a unique encoding of standard information elements of the location request by the LCS client.

6. The method of claim 1, wherein only the location information is encrypted in the response data frame.

7. The method of claim 1, wherein the response data frame is encrypted using an encryption algorithm specified through a network management system.

8. The method of claim 1, wherein the response data frame is encrypted using an encryption algorithm which is selectable by the network management system.

9. The method of claim 8, wherein the algorithm can be selected as a function of a location request type.

10. The method of claim 1, wherein the request data frame further comprises a message link field value including an encrypted position location information and an encrypted security signaling control information for allowing only the receiving LCS client to decrypt the location information.

11. The method of claim 1, wherein the step of determining the location information for the mobile terminal further comprises determining a base station in communication with the mobile terminal and applying one of a time-difference-of-arrival (TDOA), angle of arrival (AOA) or global positioning system (GPS) to locate the mobile terminal.

12. A network for locating a mobile terminal within a service area, the network comprising:
   a Network Management System (NMS) in communication with a Location Service (LCS) client, the NMS receiving a request data frame for locating the mobile terminal, the request data frame having one or more information element fields with location information or security signaling control information, and the NMS encrypting information elements of the request data frame or changing the encryption algorithm of the request data frame;
   a switching subsystem for identifying information related to mobile terminal's location; and
   a position determination entity (PDE) for receiving the mobile terminal location information and calculating the location of the mobile terminal within the network service area and for providing an encryption identifier to recognize the need for encryption of the one or more information element fields of the request data frame, the identifier including type, priority and quality of service portions.

13. The network of claim 12, wherein the network is a Global System for Mobile Communication (GSM) network.

14. The network of claim 12, wherein the network is a Universal Mobile Telecommunication System (UMTS) network.

15. The network of claim 12, wherein the NMS configures encryption algorithm at the PDE for encrypting mobile terminal location information of the data request.

16. The network of claim 12, wherein the data request is decrypted at the LCS.

17. The network of claim 12, wherein the switching subsystem further comprises:
   a Gateway Mobile Location Center (GMLC) for identifying the mobile terminal's position relative to a network node;
   a Mobile Switching Center (MSC) for establishing a signal connection with the mobile terminal;
   a Base Station Controller (BSC) for communicating with the mobile terminal; and
   a Serving Mobile Location Center (SMLC) for performing position calculation and identifying information related to mobile terminal's location.

18. The network of claim 12, wherein the LCS client is external to the network.

19. The network of claim 12, wherein the LCS client is part of the network.

20. The network of claim 12, further comprising a Location Management Unit for communicating information related to mobile terminal's location to the PDE.

21. The network of claim 12, further comprising a Home Location Register (HLR) for storing mobile terminal data.

22. The network of claim 12, wherein the PDE encrypts only the portion of the request data frame containing location information.

23. The network of claim 12, wherein the PDE encrypts a header portion of the request data frame containing location information.

24. A Position Determination Entity (PDE) for locating a mobile terminal within a communication network, comprising:
- a circuitry having at least one microprocessor, and
- a memory in communication with the microprocessor, the memory is programmed with instructions to:
  - receive a request data frame to locate the mobile terminal, the request data frame having one or more information element fields with location information or security signaling control information;
  - determine latitude and longitude location information for the mobile terminal;
  - provide an encryption identifier to recognize the need for encryption, the identifier including type, priority and quality of service portions;
  - encrypt at least one of the information element fields of the request data frame using the encryption identifier;
  - form a response data frame having encrypted location information; and
  - decrypt the location information and communicate the decrypted location information to the client.

25. The PDE of claim 24, wherein the requested data frame is originated from a client.

26. The PDE of claim 24, wherein the communication network is a Global System for Mobile Communication (GSM) network.

27. The PDE of claim 24, wherein the communication network is a Universal Mobile Telecommunication System (UMTS) network.

28. The PDE of claim 24, wherein the memory is further programmed to encrypt only the portion of the request data frame containing location information.

29. The PDE of claim 24, wherein the response data frame contains unencrypted information not relating to the location of the mobile terminal.

30. The PDE of claim 24, wherein the request data frame and the response data frame are encrypted using an encryption algorithm.

31. The PDE of claim 24, wherein the memory is further programmed with instructions to determine location information for the mobile terminal using one of a time-difference-of-arrival (TDOA), angle of arrival (AOA) or global positioning system (GPS).

32. A Location Service (LCS) client for requesting the location of a mobile terminal within a communication network, comprising:
- a circuitry having at least one microprocessor, and
- a memory in communication with the microprocessor, the memory is programmed with instructions to:
  - uniquely encode one or more information element fields having location information or security signaling control information in a request data frame sent to a Position Determination Entity (PDE) to locate the mobile terminal where the unique encoding allows the PDE to determine that a particular location response having latitude and longitude location information must be encrypted by using an encryption identifier to recognize the need for encryption, the identifier including type, priority and quality of service portions;
  - decrypt the latitude and longitude location information and communicate the decrypted location information to the client.

33. The LCS of claim 32, wherein the requested data frame is originated from a client.

34. The LCS of claim 32, wherein the communication network is a Global System for Mobile Communication (GSM) network.

35. The LCS of claim 32, wherein the communication network is a Universal Mobile Telecommunication System (UMTS) network.

36. The LCS of claim 32, wherein the memory is further programmed to encrypt only the portion of the request data frame containing location information.

37. The LCS of claim 32, wherein the response data frame contains unencrypted information not relating to the location of the mobile terminal.

38. The LCS of claim 32, wherein the request data frame and the response data frame are encrypted using an encryption algorithm.

39. The LCS of claim 32, wherein the memory is further programmed with instructions to determine location information for the mobile terminal using one of a time-difference-of-arrival (TDOA), angle of arrival (AOA) or global positioning system (GPS).

* * * * *